(12) United States Patent
Tottori et al.

(10) Patent No.: US 7,978,108 B2
(45) Date of Patent: Jul. 12, 2011

(54) PARALLEL DATA OUTPUT CONTROL CIRCUIT AND SEMICONDUCTOR DEVICE

(75) Inventors: Isao Tottori, Tokyo (JP); Masaru Hagiwara, Tokyo (JP)

(73) Assignee: Renesas Electronics Corporation, Kanagawa (JP)

(\*) Notice: Subject to any disclaimer, the term of this patent is extended or adjusted under 35 U.S.C. 154(b) by 0 days.

(21) Appl. No.: 12/762,955

(22) Filed: Apr. 19, 2010

(65) Prior Publication Data

US 2010/0201548 A1 Aug. 12, 2010

Related U.S. Application Data

(62) Division of application No. 12/209,795, filed on Sep. 12, 2008, now Pat. No. 7,764,209.

(30) Foreign Application Priority Data

Sep. 25, 2007 (JP) ................................. 2007-246856

(51) Int. Cl.
*H03M 1/00* (2006.01)
(52) U.S. Cl. .......................... 341/142; 341/100; 341/101
(58) Field of Classification Search .................. 341/142, 341/100, 101; 702/67; 345/542; 84/603
See application file for complete search history.

(56) References Cited

U.S. PATENT DOCUMENTS

| 5,267,245 | A | 11/1993 | Maruyama et al. |
| 5,347,478 | A | 9/1994 | Suzuki et al. |
| 5,867,180 | A | 2/1999 | Katayama et al. |
| 6,041,093 | A | 3/2000 | Cho |
| 6,441,290 | B2 | 8/2002 | Fujita et al. |
| 6,757,006 | B1 | 6/2004 | Yabe |
| 7,260,489 | B2 | 8/2007 | Yao et al. |
| 2001/0017076 | A1 | 8/2001 | Fujita et al. |
| 2007/0115257 | A1 | 5/2007 | Sugiyama et al. |

FOREIGN PATENT DOCUMENTS

JP    2001-077800    3/2001

*Primary Examiner* — Jean B Jeanglaude
(74) *Attorney, Agent, or Firm* — McDermott Will & Emery LLP

(57) ABSTRACT

A CPU outputs digital data from a built-in RAM to a buffer in response to a request from the buffer. The buffer has a FIFO configured of a plurality of stages, each stage of the FIFO is capable of storing one unit (10 bits) of digital data, the buffer as a whole is capable of storing digital data in number of units equivalent to the number of configured stages. A register captures digital data stored inside the buffer by each unit in synchronous with an output control clock. The digital data stored in the register is outputted to a parallel DAC as data for D/A conversion. A WR signal output timer generates a writing control signal having one shot pulse of "L" in synchronous with the output control clock.

9 Claims, 11 Drawing Sheets

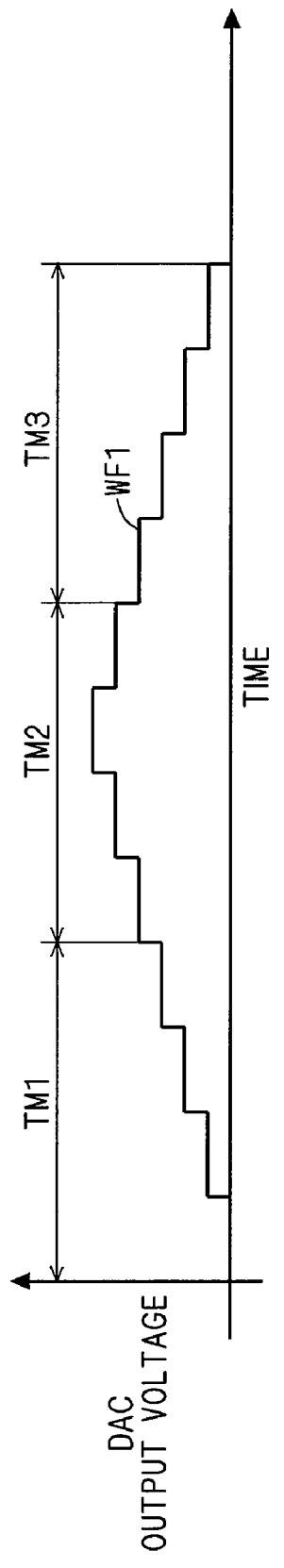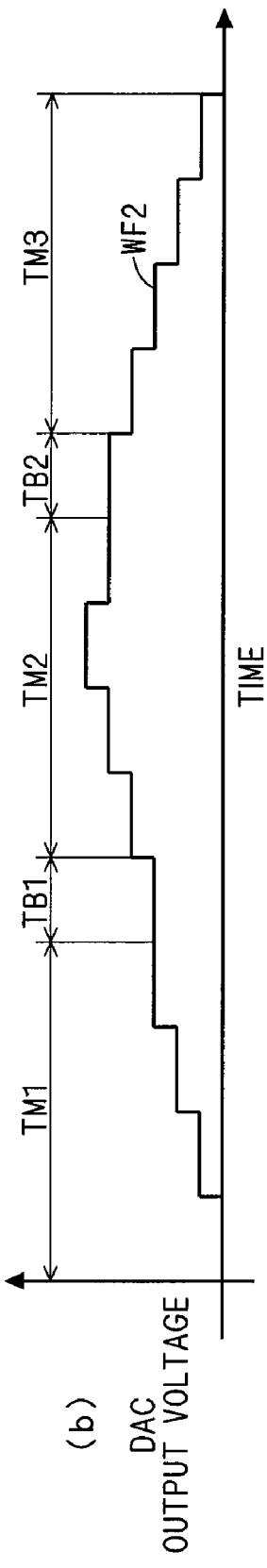
FIG. 3A
FIG. 3B

F I G . 1 1 A
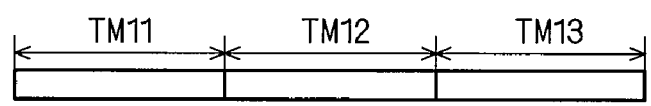
F I G . 1 1 B
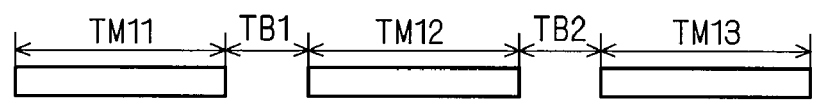

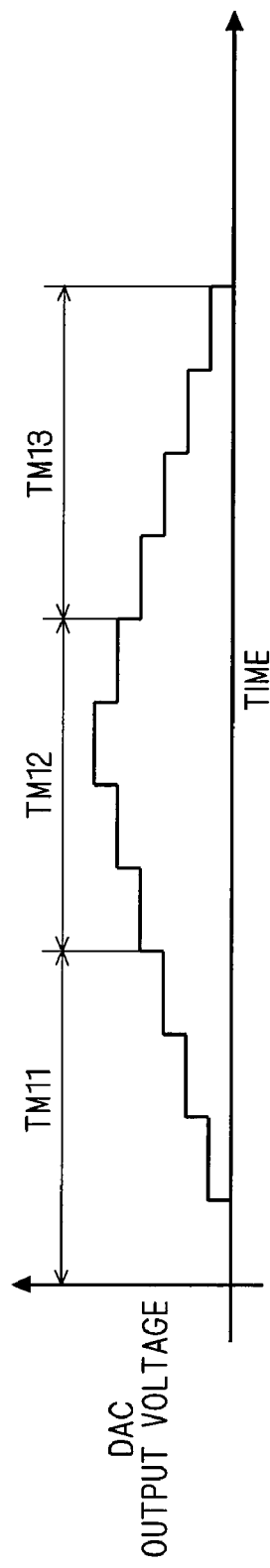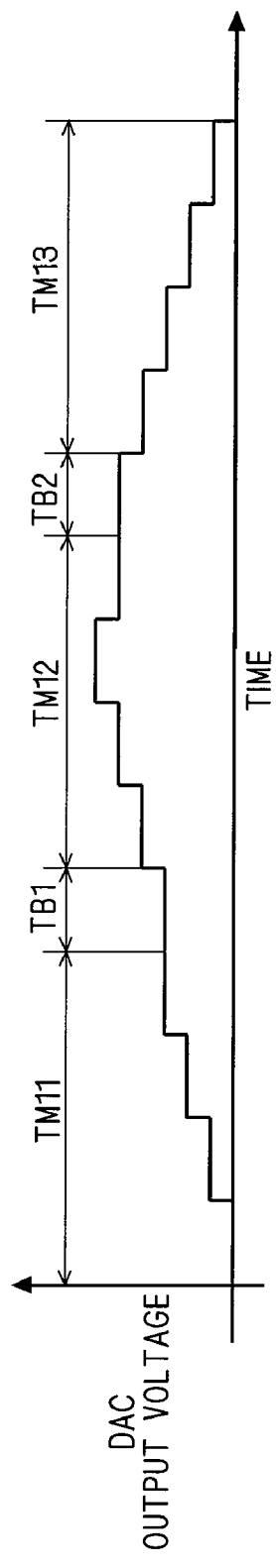

US 7,978,108 B2

PARALLEL DATA OUTPUT CONTROL CIRCUIT AND SEMICONDUCTOR DEVICE

RELATED APPLICATIONS

This application is a Divisional of U.S. Application No. 12/209,795, filed on Sep. 12, 2008 now U.S. Pat. No. 7,764,209, claiming priority of Japanese Patent Application No. 2007-246856, filed on Sep. 25, 2007, the entire contents of each of which are hereby incorporated by reference.

BACKGROUND OF THE INVENTION

1. Field of the Invention

The present invention relates to a parallel data output control circuit that outputs data for D/A conversion to a DAC (D/A converter), and also controls a DA output cycle.

2. Description of the Background Art

Conventionally, a parallel data output control, in which data for D/A control is outputted to a DAC and a DA output cycle is controlled, has typically been performed by means of an interruption command from a timer made by software processing executed by a prescribed CPU (MCU) built in a microcomputer or the like. As a technique in which data is transmitted by the microcomputer (CPU) in controlling an object to be processed such as the above-mentioned DAC, there is, for example, a serial transmission/reception circuit disclosed in Japanese Patent Application Laid-Open No. 2001-77800.

As thus described, since the parallel data output control has conventionally been executed by means of the interruption command made by the software processing, there has been a problem in that a timing at which the DAC itself captures data for D/A conversion largely depends upon a processing statues of the CPU which executes the software processing.

FIGS. 11A and 11B and FIGS. 12A and 12B show explanatory views for explaining the above-mentioned conventional problem. As shown in FIG. 11A, modulation periods TM11 to TM13 are continuously executed at normal time when the software processing is executed without delay. It is to be noted that the modulation period means a period that is classified based upon contents of parallel data controls that define a later-described a DAC output voltage waveform, such as a DA conversion cycle.

On the other hand, as shown in FIG. 11B, at abnormal time when a blank period TB1 and a blank period TB2 are generated respectively between the modulation periods TM11 and TM12 and the modulation periods TM12 and TM13, a data transmission control is performed in which an update cycle for the data for D/A conversion outputted to the DAC is displaced as a whole.

FIGS. 12A and 12B are an explanatory view showing output voltage waveforms of the DAC at the normal time and the abnormal time. As shown in FIG. 12A, at the normal time, since the modulation periods TM11 to TM13 are continuously set, it is possible to obtain a desired DAC output voltage waveform.

On the other hand, as shown in FIG. 12B, at the abnormal time, the blank period TB1 and the blank period TB2 are generated among the modulation periods TM11 to TM13. Thereby, due to the generation of the blank periods TB1 and TB2, the desired DAC output voltage waveform is extended and formed into an undesired shape, as compared with FIG. 12A. As thus described, there has been a problem in that at the abnormal time, establishment of highly reliable communication is difficult and the desired DAC output voltage waveform cannot be generated.

There has also been a problem of a cost increase due to an increase in number of components out of the need for mounting another CPU to prevent an influence from another control and perform a target control in order to ensure reliability.

SUMMARY OF THE INVENTION

It is an object the present invention to obtain a parallel data output control circuit capable of constantly performing a parallel data output control with high reliability.

Further, it is also an object of the present invention to have built in a function capable of performing the parallel data output control with high reliability without causing deterioration in performance of a CPU and without dependence upon a state of an internal bus, so as to integrate a control which has conventionally been performed in a separate CPU and thus reduce cost.

According to the present invention, the parallel data output control circuit is provided with a buffer made up of a FIFO configured of a plurality of stages before a stage of a register that stores data for D/A conversion. The buffer is capable of outputting a request to obtain digital data in number equivalent to a required number of units from a CPU.

According to the present invention, with the buffer interposed between the register and the CPU as a supply source of digital data, a time margin can be made in transmission of digital data from the CPU to the register, and thereby, the parallel data output control circuit of the present invention exerts the effect of being able to establish parallel data output control on (data communication accuracy of) the DAC with high accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B are graphs showing an effect of the parallel data output control circuit of the first embodiment;

FIGS. 11A and 11B are explanatory views for explaining a conventional problem; and FIGS. 12A and 12B are explanatory views for explaining the conventional problem.

DESCRIPTION OF THE PREFERRED EMBODIMENTS

First Embodiment (Configuration)

Figure 1:
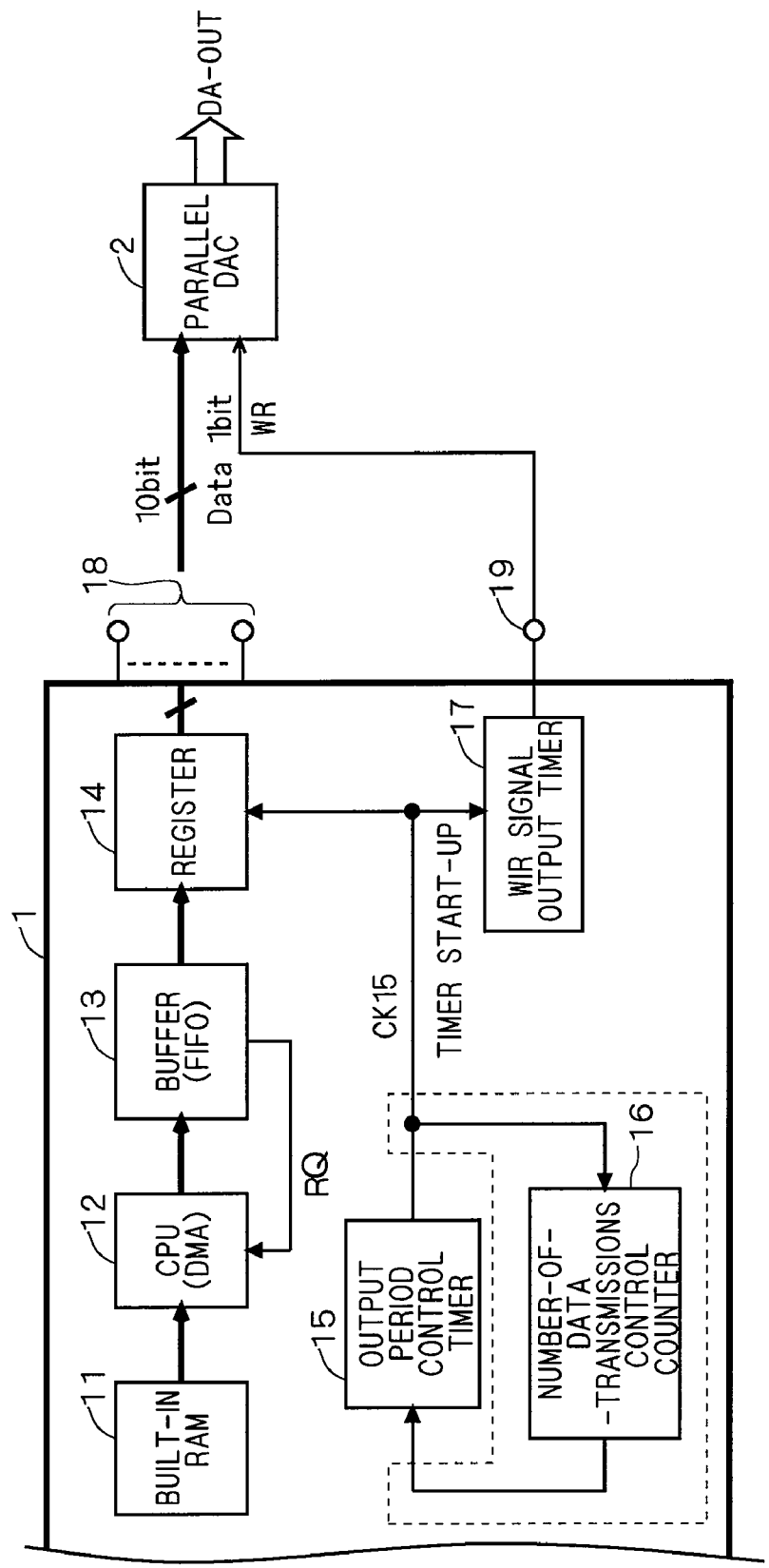
FIG. 1 is a block diagram showing a configuration of a control microcomputer being a parallel data output control circuit as the first embodiment of the present invention.

FIG. 1 is a block diagram showing a configuration of a control microcomputer being a parallel data output control circuit as a first embodiment of the present invention.

As shown in the figure, a control microcomputer 1 of the first embodiment outputs 10-bit D/A conversion data Data and a one-bit writing control signal WR to a parallel DAC 2 through an external output terminal group 18 (first external connection terminal group) and an external output terminal section 19 (second external connection terminal group). The parallel DAC 2 D/A-converts the D/A conversion data Data at a control timing directed by the writing control signal WR, and outputs a result of the conversion as a DAC output DA-OUT.

The control microcomputer 1 is configured of a built-in RAM 11, a CPU 12, a buffer 13, a register 14, an output cycle control timer 15, a number-of-data-transmissions control counter 16, and a WR signal output timer 17.

The built-in RAM 11 stores in its inside digital data as the D/A conversion data Data, and the CPU 12 outputs the digital data from the built-in RAM 11 to the buffer 13 in response to a request (signal) RQ that directs new digital data to be outputted from the buffer 13. In this manner, the built-in RAM 11 and the CPU 12 function as a digital data generating section.

The buffer 13 as a temporary storage section has a FIFO configured of a plurality of stages. Each stage of the FIFO is capable of storing one unit (10 bits) of digital data, and the buffer 13 as a whole is capable of storing digital data in number of units equivalent to the number of configured stages.

Further, as described later, when storage of digital data is insufficient in at least part of the FIFO configured of a plurality of stages, the buffer 13 outputs the request RQ to the CPU 12 to make a request for outputting new digital data.

The register 14 captures digital data stored inside the buffer 13 by each unit in synchronous with an output control clock CK15. The digital data stored into the register 14 is outputted to the parallel DAC 2 as the D/A conversion data Data.

The output cycle control timer 15 starts up by a start-up direction made by the CPU 12, and outputs the output control clock CK15 having a clock cycle T15 at the time of start-up. The number-of-data-transmissions control counter 16 counts the number of outputs (number of clocks) of the output control clock CK15, and when determining that the number has reached a prescribed number of data transmissions, the number-of-data-transmissions control counter 16 makes the output cycle control timer 15 stop the output of the output control clock CK15.

The WR signal output timer 17 generates a writing control signal WR as one shot pulse of "L" in synchronous with the output control clock CK15. The one shot pulse of the writing control signal WR directs a timing for capture of the D/A conversion data Data by the parallel DAC 2.

(Operation)

Figure 2:
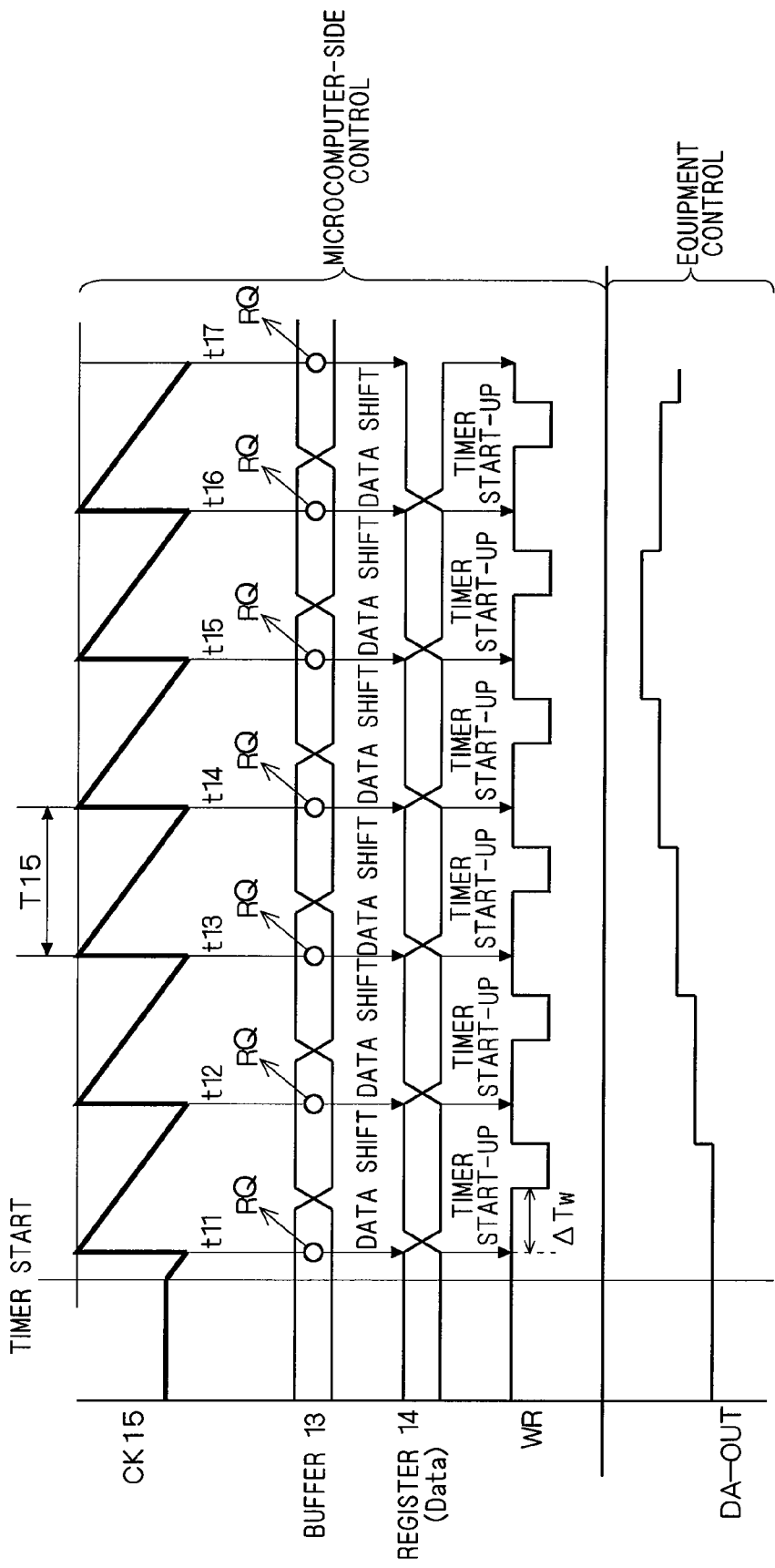
FIG. 2 is a timing chart showing a content of a parallel data output control by the control microcomputer of the first embodiment.

FIG. 2 shows a timing diagram showing a content of a parallel data output control executed by the control microcomputer 1 of the first embodiment. It is to be noted that FIG. 2 shows a case in which the number of configured steps of the FIFO as the buffer 13 is "4". In the following, a parallel data output control operation performed by the control microcomputer 1 is described with reference to FIG. 2.

(1) First, four units of digital data are previously stored inside the FIFO configured of four stages inside the buffer 13. In the example of FIG. 2, four units of digital data are stored inside the buffer 13.

(2) A start-up direction is given to the output cycle control timer 15 by software processing performed by the CPU 12, to start up the output cycle control timer 15. The output cycle control timer 15 is then set to a reload set value in every clock cycle T15, and generates a falling output control clock CK15 during the clock cycle T15.

(3-1) The register 14 stores one unit of digital data from the buffer 13 as the D/A conversion data Data in synchronous with underflow time t11 of the output control clock CK15.

(3-2) After the transmission of digital data to the register 14, when k (k=any of 1 to 4) units or more of digital data are transmitted out of the buffer 13, it is determined that a space is generated inside the buffer 13, and the buffer 13 generates the request RQ as a DMA transmission request (interruption request) that indicates the CPU 12 to transmit digital data in number equivalent to the number of the insufficient units. The CPU 12 then sets the digital data in number equivalent to the number of the insufficient units from the built-in RAM 11 by time t12 at which a next output control clock CK15 rises.

It is to be noted that in FIG. 2, the case of k=1 is shown and the buffer 13 outputs the request RQ at each of time t11 to t17.

(3-3) Meanwhile, the WR signal output timer 17 generates one shot pulse of "L" as the writing control signal WR, with the time t11 to t17 as triggers, after the lapse an offset period ΔTw. The parallel DAC 2 captures the D/A conversion data Data from the register 14 in synchronous with the fall of the writing control signal WR, performs the processing of D/A conversion, and generates the DAC output DA-OUT in synchronous with the rise of the writing control signal WR. As thus described, the one shot pulse of "L" indicates the timing for capture of the D/A conversion data Data by the parallel DAC 2.

(4) Thereafter, the processing of (3-1) to (3-3) above are repeated in synchronous with the output control clock CK15.

(5) When the number-of-data-transmissions control counter 16 counts the output control clock CK15 in number equivalent to a set number of digital data transmissions to the register 14, the operation of the output cycle control timer 15 is stopped, and thereby the parallel data output control operation is completed.

It is to be noted that there are some cases where D/A conversion data Data of 12 bits, 16 bits, or the like, is required. Assuming the case of meeting such a request from the user side, it is proposed to previously configure the (data) buffer 13 and the register 14 with a 16-bit width. When the parallel DAC 2 has accuracy of 10 bits, low-order 10 bits of the register 14 are outputted to the parallel DAC. When the parallel DAC 2 has accuracy of 12 bits, the low-order 12 bits of the register 14 are outputted to the parallel DAC. When the parallel DAC 2 has accuracy of 16 bits, low-order 16 bits of the register 14 are outputted to the parallel DAC. The output can be switched, for example, by electrically connecting the DAC 2 with the 10 bits of the external output terminal group 18 of the control microcomputer 1 with respect to the register 14. This enables the general-purpose availability of the control microcomputer 1 to be further enhanced and the semiconductor device to be more preferable as a semiconductor device for controlling the parallel DAC. As for an unused external connection terminal of the external output terminal group 18 having the 16 external output terminals, its potential may be set to a reference potential or a power potential, or fixed into a high impedance state. Further, in the case of a 17-bit parallel DAC, high-order 16 bits of the parallel DAC are provided with the D/A conversion data Data from the external output terminal group, and the lowest-order one bit of the parallel DAC is provided with a fixed signal.

(Effect)

The parallel data output control, such as data update cycle, from the CPU 12 onto the parallel DAC 2 is realized by use of dedicated hardware (the buffer 13, the register 14, the output cycle control timer 15, the number-of-data-transmissions control counter 16, and the WR signal output timer 17).

Namely, the control microcomputer 1 of the first embodiment is provided with the buffer 13 made up of the FIFO configured of a plurality of (four) stages before the stage of the register 14 that stores the D/A conversion data Data. The buffer 13 can output the request RQ, to obtain digital data in number equivalent to a required number of units from the CPU 12. It is normally possible to acquire digital data from the CPU 12 during the clock cycle T15 of the output control clock CK15.

Therefore, with the buffer 13 interposed between the CPU 12 and the register 14, a time margin can be made in transmission of digital data from the CPU 12 to the register 14, and thereby the control microcomputer 1 exerts the effect of being able to establish the parallel data output control on (data communication accuracy of) the parallel DAC 2 with high accuracy.

Moreover, since the buffer 13 outputs the request RQ to the CPU 12 in each generation of k (k=1 in FIG. 2) units of spaces, it is possible by setting the unit of k to 3 or smaller to ensure at least an auxiliary period in length equivalent to (4−k) clocks of the output control clock CK15 as a period for data transmission from the built-in RAM 11 to the buffer 13, which is requested by the CPU 12.

Therefore, in the control microcomputer 1, even in a case where digital data cannot be transmitted to the buffer 13 during a period of the clock cycle T15 from generation of the request RQ under the influence of a state of a bus inside the CPU 12, the D/A conversion data Data outputted from the register 14 does not come under the influence so long as the D/A conversion data Data can be transmitted within the above-mentioned auxiliary period. Hence it is possible to perform data transmission of the D/A conversion data Data (digital data) from the CPU 12 to the register 14 through the buffer 13 without delay and without the influence of the processing state of the CPU 12. Consequently, the control microcomputer 1 has the effect of being able to establish the parallel data output control on the parallel DAC 2 with high accuracy.

Further, the control microcomputer 1 can output the writing control signal WR from the WR signal output timer 17 in synchronous with the output control clock CK15, to indicate the parallel DAC 2 as to a timing for capture of the D/A conversion data Data in each the clock cycle T15 of the output control clock CK15.

FIGS. 3A and 3B are graphs showing an effect of the parallel data output control circuit of the first embodiment. As shown in FIG. 3A, an output voltage waveform WF1, as time series variations of results of the D/A conversion of the parallel DAC 2 output-controlled by the control microcomputer 1, is constantly successively set to modulation periods TM1 to TM3, and it is thereby possible to obtain a desired DAC output voltage waveform. Namely, even when interruption processing or the like occurs in the CPU 12, as shown in FIG. 3B, blank periods TB1 and TB2 are generated among the modulation periods TM1 to TM3, and hence the waveform is not distorted to a waveform like a parallel DAC output voltage waveform WF2.

Further, since an output timing for the register 14 is made different from an output timing for the writing control signal WR, it is possible to reliably transmit the D/A conversion data Data without the influence of a noise or the like, and also exert the effect of being able to smoothly perform data transmission from the CPU to the register in the semiconductor device.

Second Embodiment (Configuration)

Figure 4:
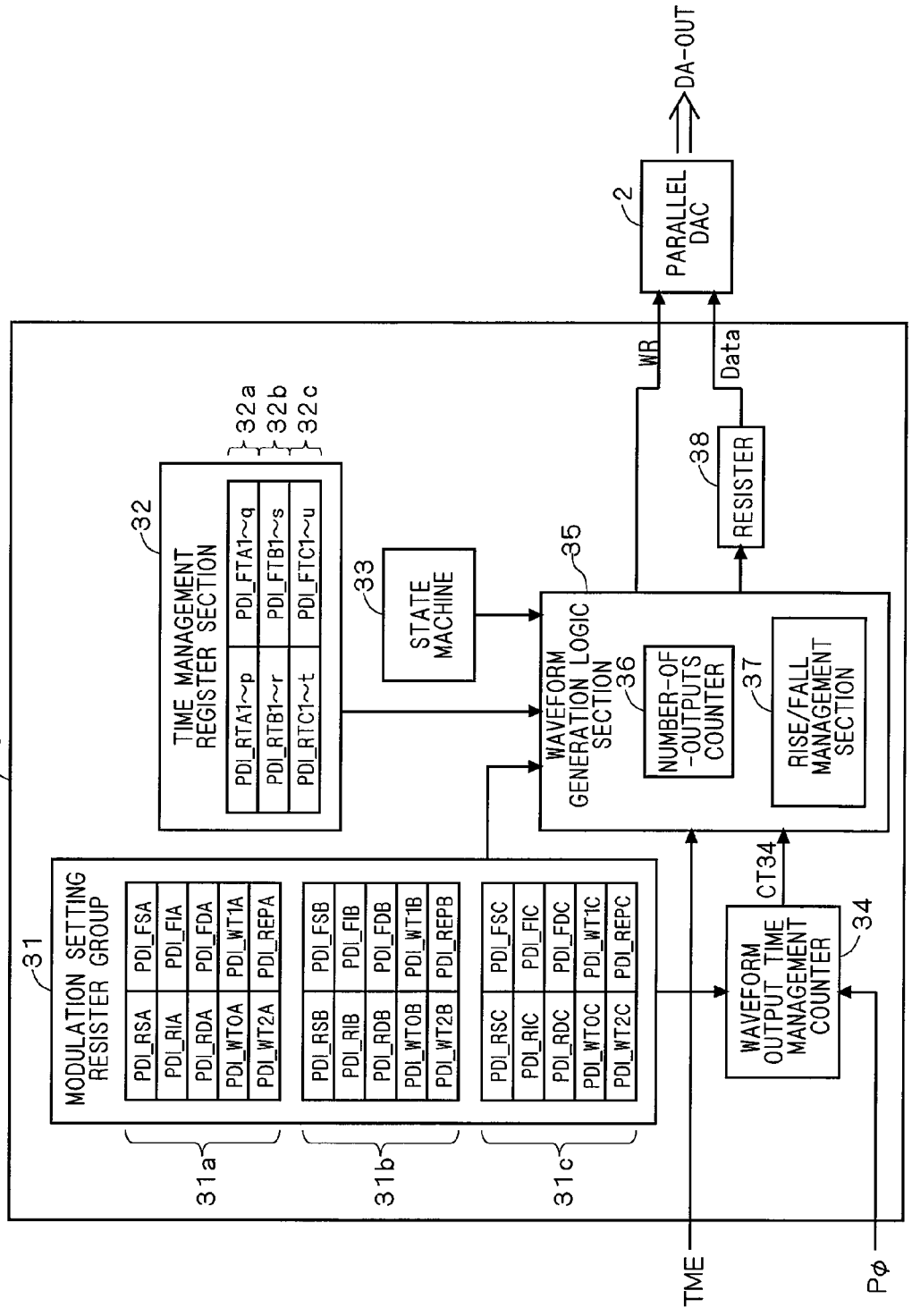
FIG. 4 is a block diagram showing a configuration of a parallel data output control circuit as the second embodiment of the present invention.

FIG. 4 is a block diagram showing a configuration of a semiconductor device including a parallel data output control circuit 3 as a second embodiment of the present invention. As shown in the figure, the parallel data output control circuit 3 and the parallel DAC 2 constitute the semiconductor device.

The parallel data output control circuit 3 can perform parallel data output control in which a parallel data output voltage waveform of a plurality of modulation contents within a prescribed control cycle can be obtained.

The parallel data output control circuit 3 of the second embodiment is started up by a timer event TME obtained from the outside such as the CPU, not shown, and the D/A conversion data Data and the writing control signal WR in time series are outputted so as to generate a parallel data output voltage waveform in a control cycle TC.

The principal section of the parallel data output control circuit 3 is configured of a modulation setting register group 31, a time management register section 32, a state machine 33, a waveform output time management counter 34, a waveform generation logic section 35, and a register 38. The waveform generation logic section 35 is configured of a number-of-outputs counter 36 and a Rise/Fall management section 37.

The modulation setting register group 31 is configured of partial register groups 31a to 31c, and the partial register groups 31a to 31c are capable of mutually independently storing a variety of modulation (content) setting parameters that define modulation contents. In the following, it is assumed for the sake of description that the partial register groups 31a, 31b and 31c respectively store parameters for the modulations A, B and C.

The time management register section 32 is configured of partial register groups 32a to 32c. The partial register groups 32a to 32c correspond to the partial register groups 31a to 31c, and store time management parameters that define time management contents of the modulations A, B and C.

As thus described, the modulation setting register group 31 and the time-management register section 32 function as a parameter storage section that stores waveform setting parameters (modulation setting parameters, time management parameters).

The state machine 33 indicates an execution sequence of the modulations respectively set in the partial register groups 31a to 31c and the partial register groups 32a to 32c. For example, a direction is given to the waveform generation logic section 35 to execute the modulations in sequence of the modulation A (the partial register groups 31a and 32a), the modulation B (the partial register groups 31b and 32b), and the modulation C (the partial register groups 31c and 32c).

The waveform output time management counter 34 counts a peripheral clock PΦ obtained from the outside, and based upon a result of the counting, and outputs to the waveform generation logic section 35 a reference clock CT34 as a reference for an operation of the waveform generation logic section 35.

The waveform generation logic section 35 generates the D/A conversion data Data and the writing control signal WR in synchronous with the reference clock CT34 based upon the variety of waveform setting parameters stored inside the modulation setting resister group 31 and the time management register section 32. Namely, the waveform generation logic section 35 has the function of outputting the D/A conversion data Data and the writing control signal WR. The register 38 stores the D/A conversion data Data, and outputs the data to the external parallel DAC 2, The parallel DAC 2 receives the writing control signal WR from the waveform generation logic section 35, and receives the D/A conversion data Data through the register 38.

It is to be noted that the waveform generation logic section 35 has the number-of-outputs counter 36 and the Rise/Fall management section 37 as principal constitutional sections. The Rise/Fall management section 37 performs a control of outputting the D/A conversion data Data for a rise waveform or a fall waveform. The number-of-outputs counter 36 counts the number of repetitions of the rise and fall waveforms in each of the modulations A to C.

(Operation)

Figure 5:
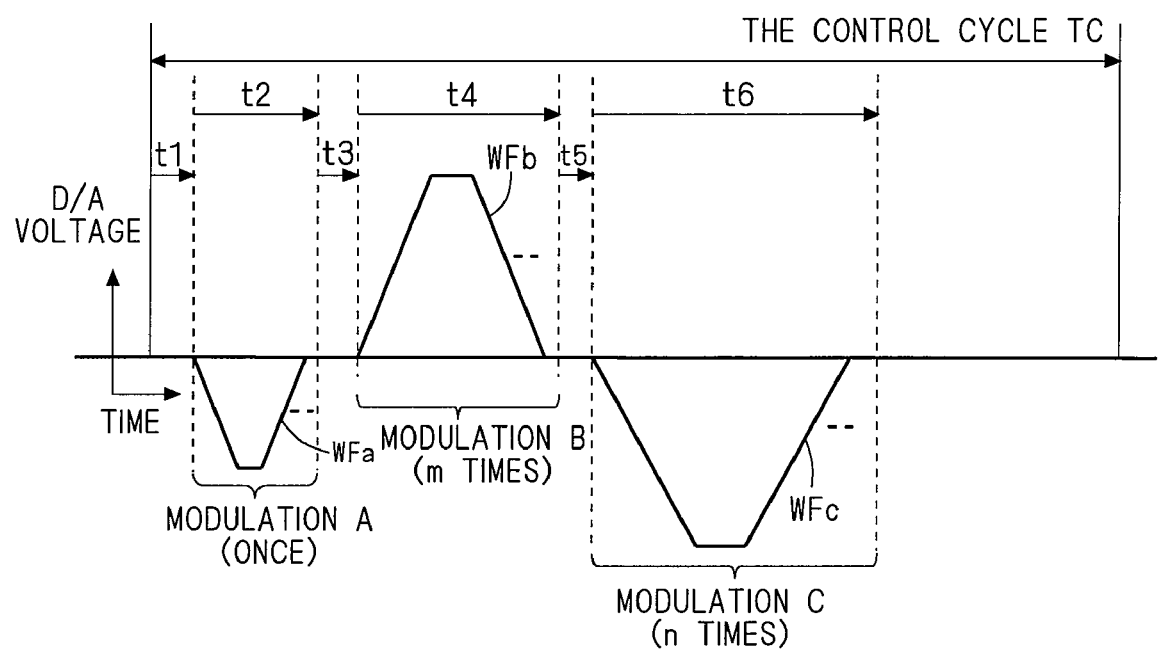
FIG. 5 is a graph showing an output waveform by a DAC output-controlled by the parallel data output control circuit of the second embodiment.

FIG. 5 is a graph showing an output waveform by the parallel DAC 2 output-controlled by the parallel data output control circuit 3 of the second embodiment. As shown in the figure, parallel data output voltage waveforms of mutually different modulation contents in the modulations A, B and C are obtained during the control cycle TC.

Namely, after the lapse of a modulation A start waiting time t1 from the start of the D/A conversion, a modulation A output cycle t2 of a parallel data output voltage waveform WFa with steep rise and fall is repeated once. Then, after the lapse of a modulation B start waiting time t3, a modulation B output cycle t4 of a parallel data output voltage waveform WFb with average-level rise and fall is repeated m times. Then, after the lapse of a modulation C start waiting time t5, a modulation C output cycle t6 of a parallel data output voltage waveform WFc with gentle rise and fall is repeated n times. It is to be noted the case is shown where polarities of the parallel data output voltage waveforms WFa and WFc are negative (the polarities thereof are minimum values), and a polarity of the parallel data output voltage waveform WFb is positive (the polarity thereof is a maximum value).

As thus described, by the parallel data output control performed by the parallel data output control circuit 3, it is possible to obtain mutually different parallel data output voltage waveforms WFa, WFb and WFc, with the polarities thereof also different, in the modulation A output cycle t2, the modulation B output cycle t4 and the modulation C output cycle t6 as the time series variations as a result of the A/D conversion by the parallel DAC 2.

(Modulation A)

Figure 6:
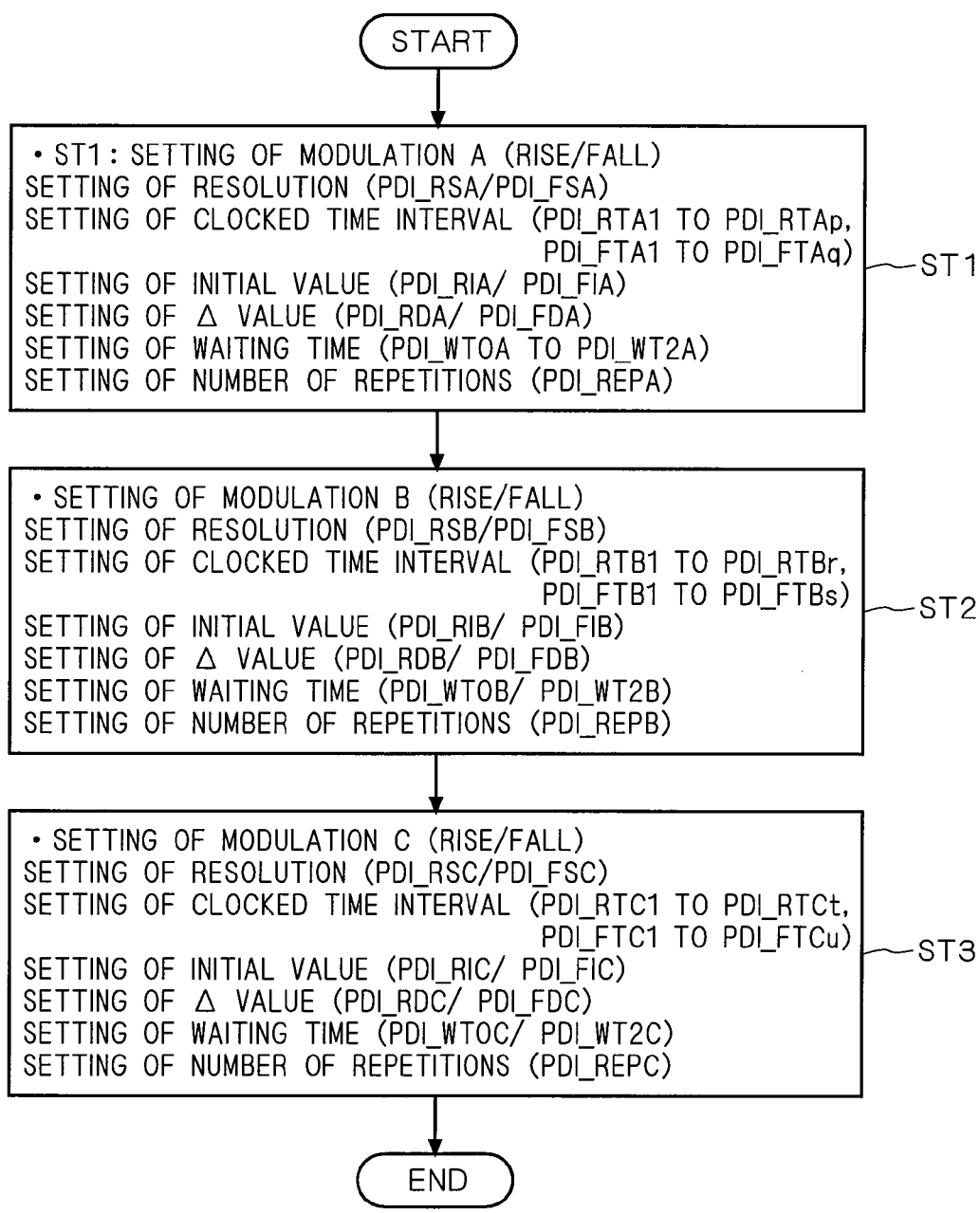
FIG. 6 is a flowchart showing a processing procedure for a parallel data output control operation of the parallel data output control circuit of the second embodiment.

FIG. 6 is a flowchart showing a processing procedure of the parallel data output control operation of the parallel data output control circuit 3. As shown in FIG. 6, the parallel data output control circuit 3 executes waveform processing in sequence of the modulations A, B and C and in sequence of steps ST1 to ST3.

Figure 7:
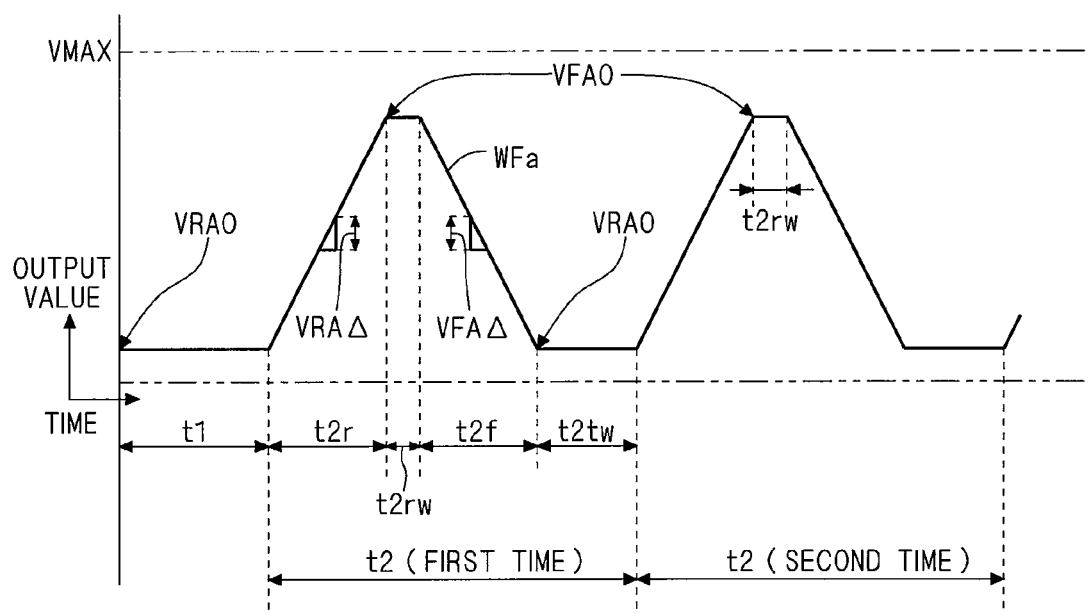
FIG. 7 is a waveform chart showing a parallel data output voltage waveform in a modulation A realized by a control of the parallel data output control circuit of the second embodiment.

FIG. 7 is a waveform chart showing the parallel data output voltage waveform WFa in the modulation A realized by the control of the parallel data output control circuit 3. It is to be noted that the case of the polarities of the parallel data output voltage waveforms WFa and WFc being positive is described hereinafter, though different from FIG. 5, for the sake of description.

Figure 8:
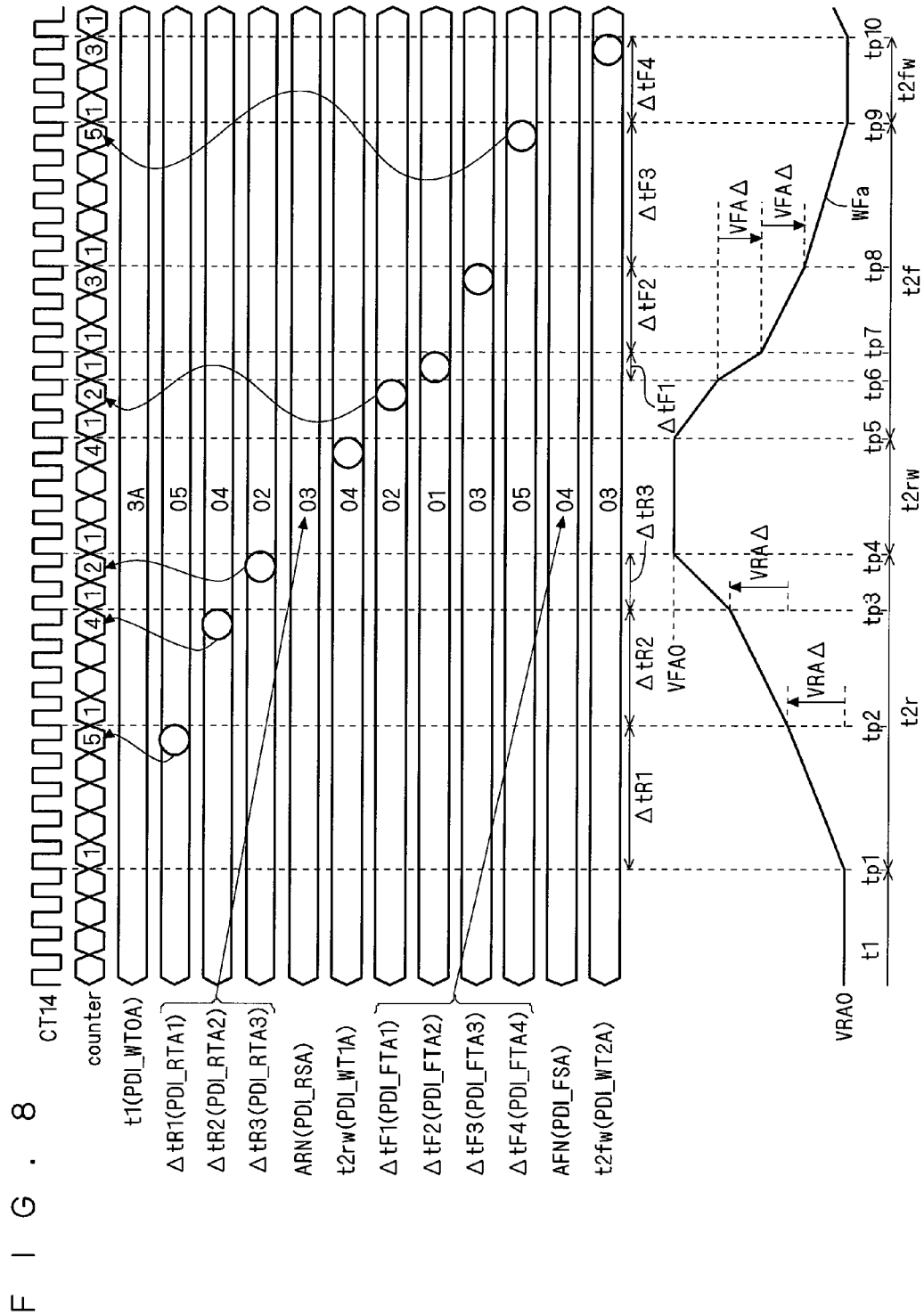
FIG. 8 is a waveform chart showing a specific example of rise and fall waveforms within the parallel data output voltage waveform in the modulation A.

FIG. 8 describes a waveform chart showing a specific example of rise and fall waveforms within the parallel data output voltage waveform WFa. In the following, a control operation for obtaining the parallel data output voltage waveform WFa in the modulation A performed by the parallel data output control circuit 3 is described with reference to FIGS. 6 to 8.

First, in the step ST1, the waveform generation logic section 35 acquires parameters regarding the waveform in the modulation A from the partial register group 31a in the modulation setting register group 31, and sets a variety of data regarding the waveform in the modulation A. Specifically, a parameter PDI_RSA is acquired, and the number of rise clocks ARN as a resolution at the time of rising is set. A parameter PDI_FSA is acquired, and the number of fall clocks AFN as a resolution at the time of falling is set. A parameter PDI_RIA is acquired, and a modulation A rise initial value VRA0 is set. A parameter PDI_FIA is acquired, and a modulation A fall initial value VFA0 is set.

Subsequently, a parameter PDI_RDA is acquired, and a modulation A clocked rise amount VRAΔ (Δ value) is set. A parameter PDI_FDA is acquired, and a modulation A clocked fall amount VFAΔ is set. Further, a parameter PDI_WT0A is acquired, and a modulation A start waiting time t1 is set. A parameter PDI_WT1A is acquired, and a modulation A after-rise waiting period t2rw is set. A parameter PDI_WT2A is acquired, and a modulation A after-fall waiting period t2fw is set. Thereafter, a parameter PDI_REPA is acquired, and the number of repetitions of the modulation A output cycles is set to 1.

Further, the waveform generation logic section 35 acquires, from the partial register group 32a in the time management register section 32, time management parameters regarding the modulation A clocked rise amount VRAΔ and a modulation A clocked fall amount VFAΔ. Specifically, parameters PDI_RTA1 to p are acquired, and rise clock time widths ΔtR1 to ΔtRp are set. Parameters PDI_FTA1 to q are acquired, and rise clock time widths ΔtF1 to ΔtFq are set. At this time, p≧ARN and q≧AFN are satisfied.

It is to be noted that a set content of the parallel data output voltage waveform WFa in FIG. 8 is as follows. The modulation A start waiting time t1 (PDI_WT0A) is set to "3A" [the number of counts of the reference clock CT34 (hexadecimal numeral), the same applies hereinafter], the modulation after-rise waiting period t2rw (PDI_WT1A) is set to "04", and the modulation after-fall waiting period t2fw (PDI_WT2A) is set to "03".

Further, the number of rise clocks ARN (PDI_RSA) is set to "03", and the number of fall clocks AFN (PDI_RSA) is set to "04". The rise clock time widths ΔtR1, ΔtR2 and ΔtR3 (PDI_RTA1 to 3) are set to "05", "04" and "02", and the fall clock time widths ΔtF1, ΔtF2, ΔtF3 and ΔtF4 (PDI_FTA1 to 4) are set to "02", "01" and "03", and "05".

The waveform generation logic section 35 outputs the D/A conversion data Data and the writing control signal, so as to obtain the parallel data output voltage waveform WFa shown in FIG. 7 in synchronous with the reference clock CT34 based upon the waveform setting parameters obtained from the partial register group 31a in the modulation setting register group 31 and the partial register group 32a in the time management register section 32.

First, as shown in FIG. 7, after the start of the parallel data output control operation, the output value is held at the modulation A rise initial value VRA0 at the modulation A start waiting time t1. In the case of the specific example of FIG. 8, the modulation A start waiting time t1 equivalent to the number "3A" of clocks of the reference clock CT34 is set.

The outputs of the D/A conversion data Data and the writing control signal WR at the modulation A start waiting time t1 are performed, for example, in the following manner. At the start of the modulation A start waiting time t1, the modulation A rise initial value VRA0 is outputted as the D/A conversion data Data. Meanwhile, at the start of the modulation A start waiting time t1, one shot pulse on the "L" level is generated once as the writing control signal WR.

Then, in the modulation A rise period t2r, such a control is performed that the output value is successively increased by the modulation A clocked rise amount VRAΔ over the number of rise clocks ARN from the modulation A rise initial value VRA0.

In the case of the specific example of FIG. 8, the output value increases by the modulation A clocked rise amount VRAΔ from the start time tp1 of the modulation A rise period t2r to the time tp2 after the lapse of the rise clock time width ΔtR1 equivalent to "5" clocks of the reference clock CT34.

Subsequently, the output value increases by the modulation A clocked rise amount VRAΔ from the time tp2 to the time tp3 after the lapse of the rise clock time width ΔtR2 equivalent to "4" clocks of the reference clock CT34.

Finally, the output value increases by the modulation A clocked rise amount VRA from the time tp3 to the time tp4 after the lapse of the rise clock time width ΔtR3 equivalent to "2" clocks of the reference clock CT34, and reaches the modulation A fall initial value VFA0. Therefore, the modulation A rise period t2r is (ΔtR1+ΔtR2+ΔtR3).

The outputs of the D/A conversion data Data and the writing control signal WR in the modulation A rise period t2r are performed, for example, in the following manner. From the start of the modulation A rise period t2r, the output value is increased by the modulation A clocked rise amount VRAΔ in each rise clock time width ΔtRi (i=1 to p(3)) from the modulation A rise initial value VRA0, and finally, the D/A conversion data Data which is the modulation A fall initial value VFA0 is outputted. Meanwhile, during the modulation A rise period t2r, the writing control signal WR that generates one shot pulse on the "L" level is outputted in each clock time width ΔtRi.

Then, in the modulation A after-rise waiting period t2rw, the parallel data output voltage waveform WFa is held at the modulation A fall initial value VFA0. In the case of the specific example of FIG. 8, the modulation A after-rise waiting period t2rw (time tp4 to time tp5) equivalent to the number "04" of clocks of the reference clock CT34 is set.

The outputs of the D/A conversion data Data and the writing control signal WR are performed, for example, in the following manner. Since the output value has already reached the modulation A fall initial value VFA0, the D/A conversion data Data is held at the modulation A fall initial value VFA0. Meanwhile, the writing control signal WR is fixed to "H" in the modulation A after-rise waiting period t2rw.

Next, in the modulation A fall period t2f, such a control is performed that the output value is successively decreased by the modulation A clocked fall amount VFAΔ over the number of fall clocks AFN from the modulation A fall initial value VFA0.

In the case of the specific example of FIG. 8, the output value decreases by the modulation A clocked fall amount VFAΔ from the start time tp5 of the modulation A fall period t2f to the time tp6 after the lapse of the fall clock time width ΔtF1 equivalent to "2" clocks of the reference clock CT34.

Subsequently, the output value decreases by the modulation A clocked fall amount VFAΔ from the time tp6 to the time tp7 after the lapse of the fall clock time width ΔtF2 equivalent to "1" clock of the reference clock CT34.

Further, the output value decreases by the modulation A clocked fall amount VFAΔ from the time tp7 to the time tp8 after the lapse of the fall clock time width ΔtF3 equivalent to "3" clocks of the reference clock CT34.

Finally, the output value decreases by the modulation A clocked fall amount VFA from the time tp8 to the time tp9 after the lapse of the fall clock time width ΔtF4 equivalent to "5" clocks of the reference clock CT34, and reaches the modulation A rise initial value VRA0. Therefore, the modulation A fall period t2f is (ΔtF1+ΔtF2+ΔtF3+ΔtF4).

The outputs of the D/A conversion data Data and the writing control signal WF in the modulation A fall period t2f are performed, for example, in the following manner. From the modulation A fall period t2f, the output value is decreased by the modulation A clocked fall amount VFAΔ in each fall clock time width ΔtFj (j=1 to q(4)) from the modulation A fall initial value VFA0, and finally, the D/A conversion data Data which is the modulation A fall initial value VFA0 is outputted. Meanwhile, during the modulation A fall period t2f, the writing control signal WR that generates one shot pulse on the "L" level is outputted in each fall clock time width ΔtFj.

Then, in the modulation A after-fall waiting period t2fw, the output value is held at the modulation A rise initial value VRA0. In the case of the specific example of FIG. 8, the modulation A after-fall waiting period t2fw (time tp9 to time tp10) equivalent to the number "03" of clocks of the reference clock CT34 is set.

The outputs of the D/A conversion data Data and the writing control signal WR in the modulation A after-waiting period t2fw are performed, for example, in the following manner. Since the output value has already reached the modulation A rise initial value VRA0, the D/A conversion data Data is held at the modulation A rise initial value VRA0. Meanwhile, the writing control signal WR is fixed to "H" in the modulation A after-fall waiting period t2fw.

As thus described, the D/A conversion data Data and the writing control signal WR for obtaining the parallel data output voltage waveform WFa are outputted by the Rise/Fall management section 37 inside the waveform generation logic section 35 in each modulation A output cycle t2. Thereafter, under the control of the number-of-outputs counter 36, the parallel data output voltage waveform WFa is repeated in number equivalent to one time of repetition of the modulation A output cycle, and the output control in the modulation A is completed.

(Modulation B)

Figure 9:
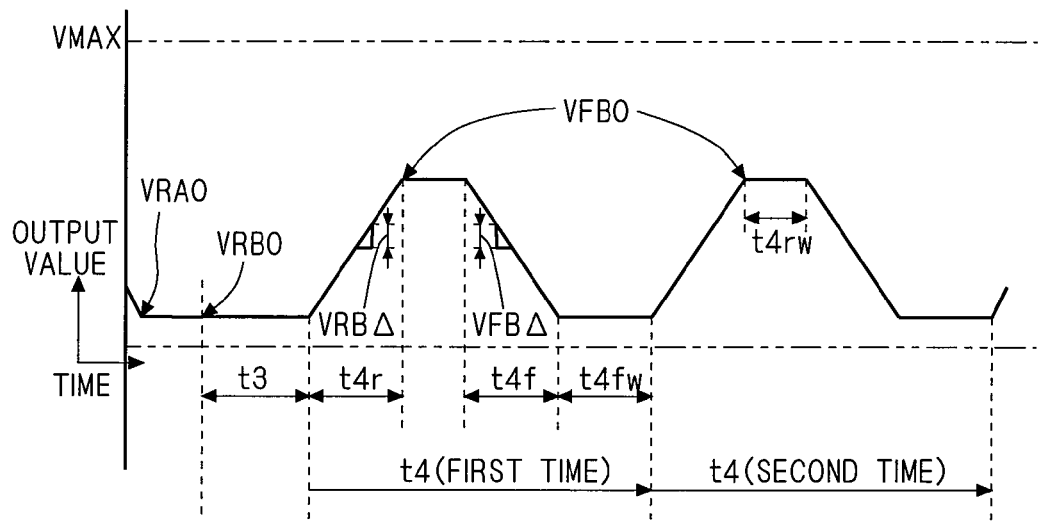
FIG. 9 is a waveform chart showing a parallel data output voltage waveform in a modulation B realized by a control of the parallel data output control circuit of the second embodiment.

FIG. 9 is a waveform chart showing the parallel data output voltage waveform WFb in the modulation B realized by the control of the parallel data output control circuit 3. In the following, a control operation for obtaining the parallel data output voltage waveform WFb in the modulation B realized by the parallel data output control circuit 3 is described with reference to FIGS. 6 to 9.

In the step ST2 of FIG. 6, the waveform generation logic section 35 acquires parameters regarding the waveform in the modulation B from the partial register group 31b in the modulation setting register group 31, and sets a variety of data regarding the waveform in the modulation B. Specifically, a parameter PDI_RSB is acquired, and the number of rise clocks BRN as a resolution at the time of rising is set. A parameter PDI_FSB is acquired, and the number of fall clocks BFN as a resolution at the time of falling is set. A parameter PDI_RIB is acquired, and a modulation B rise initial value VRB0 is set. A parameter PDI_FIB is acquired, and a modulation B fall initial value VFB0 is set.

Subsequently, a parameter PDI_RDB is acquired, and a modulation B clocked rise amount VRBΔ is set. A parameter PDI_FDB is acquired, and a modulation B clocked fall amount VFBΔ is set. Further, a parameter PDI_WT0B is acquired, and a modulation B start waiting time t3 is set. A parameter PDI_WT1B is acquired, and a modulation B after-rise waiting period t4$rw$ is set. A parameter PDI_WT2B is acquired, and a modulation B after-fall waiting period t4$fw$ is set. Moreover, a parameter PDI_REPB is acquired, and the number of repetitions of the modulation B output cycles is set to m.

Further, the waveform generation logic section 35 acquires, from the partial register group 32$b$ in the time management register section 32, time management parameters regarding the modulation B clocked rise amount VRBΔ and a modulation B clocked fall amount VFBΔ. Specifically, parameters PDI_RTB1 to r are acquired, and rise clock time widths ΔtR1 to ΔtRr are set. Parameters PDI_FTB1 to s are acquired, and fall clock time widths tF1 to ΔtFs are set. At this time, r≧BRN and s≧BFN are satisfied.

The waveform generation logic section 35 outputs the D/A conversion data Data and the writing control signal, so as to obtain the parallel data output voltage waveform WFb shown in FIG. 9 in synchronous with the reference clock CT34 based upon the waveform setting parameters obtained from the partial register group 31$b$ in the modulation setting register group 31 and the partial register group 32$b$ in the time management register section 32.

First, as shown in FIG. 9, after the output of the waveform of the parallel data output voltage waveform WFa in the modulation A, the output value is held at the modulation B rise initial value VRB0 at the modulation B start waiting time t3.

Subsequently, in the modulation B rise period t4$r$, such a control is performed that the output value is successively increased by the modulation B clocked rise amount VRBΔ in each rise clock time width ΔtRi (i=1 to BRN) over the number of rise clocks BRN from the modulation B rise initial value VRB0. As a result, the output value reaches the modulation B fall initial value VFB0 at the end of the modulation B rise period t4$r$.

Thereafter, in the modulation B after-rise waiting period t4$rw$, the parallel data output voltage waveform WFb is held at the modulation B fall initial value VFB0.

Next, in the modulation B fall period t4$f$, such a control is performed that the output value is successively decreased by the modulation B clocked fall amount VFBΔ in each fall clock time width ΔtFj (j=1 to BFN) over the number of fall clocks BFN from the modulation B fall initial value VFB0. As a result, the output value reaches the modulation B rise initial value VRB0 at the end of the modulation B fall period t4$f$.

Thereafter, in the modulation B after-fall waiting period t4$fw$, the parallel data output voltage waveform WFb is held at the modulation B rise initial value VRB0.

As thus described, the D/A conversion data Data and the writing control signal WR for obtaining the parallel data output voltage waveform WFb are outputted by the Rise/Fall management section 37 inside the waveform generation logic section 35 in each modulation B output cycle t4. Thereafter under the control of the number-of-outputs counter 36, the parallel data output voltage waveform WFb is repeated in number equivalent to m times of repetitions of the modulation B output cycles, and the output control in the modulation B is completed.

It is to be noted that the outputs of the D/A conversion data Data and the writing control signal WR are performed in the same manner as in the modulation A each at the modulation B start waiting time t3, the modulation B rise period t4$r$, the modulation B after-rise waiting period t4$rw$, the modulation B fall period t4$f$, and the modulation B after-fall waiting period t4$fw$.

(Modulation C)

Figure 10:
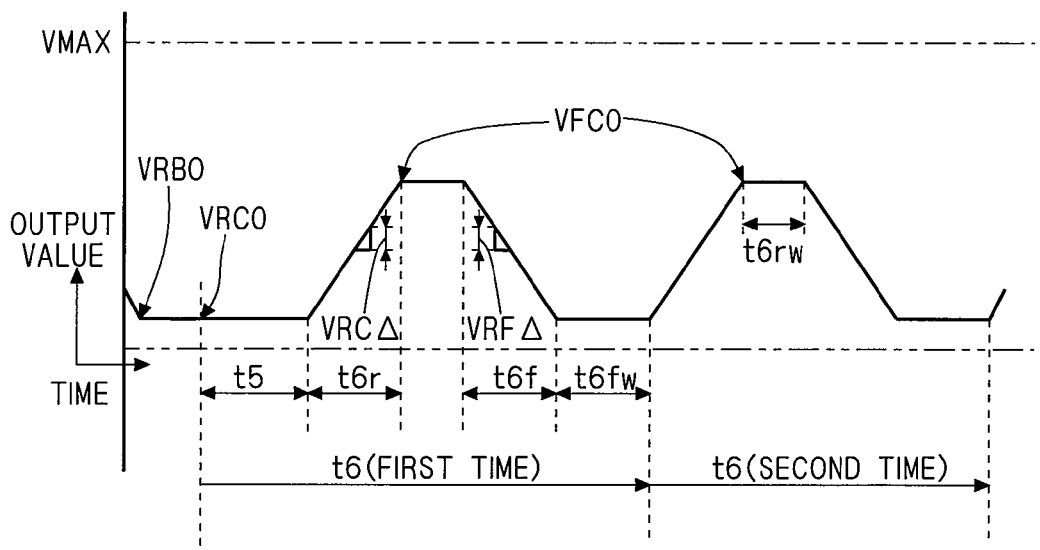
FIG. 10 is a waveform chart showing a parallel data output voltage waveform in a modulation C realized by a control of the parallel data output control circuit of the second embodiment.

FIG. 10 is a waveform chart showing the parallel data output voltage waveform WFc in the modulation C realized by the control of the parallel data output control circuit 3. In the following, a control operation for obtaining the parallel data output voltage waveform WFc in the modulation C realized by the parallel data output control circuit 3 is described with reference to FIGS. 6 to 10.

In the step ST3 of FIG. 6, the waveform generation logic section 35 acquires parameters regarding the waveform in the modulation C from the partial register group 31$c$ in the modulation setting register group 31, and sets a variety of data regarding the waveform in the modulation C. Specifically, a parameter PDI_RSC is acquired, and the number of rise clocks CRN as a resolution at the time of rising is set. A parameter PDI_FSC is acquired, and the number of fall clocks CFN as a resolution at the time of falling is set. A parameter PDI_RIC is acquired, and a modulation C rise initial value VRC0 is set. A parameter PDI_FIC is acquired, and a modulation C fall initial value VFC0 is set.

Subsequently, a parameter PDI_RDC is acquired, and a modulation C clocked rise amount VRCΔ is set. A parameter PDI_FDC is acquired, and a modulation C clocked fall amount VFCΔ is set. Further, a parameter PDI_WT0C is acquired, and a modulation C start waiting time t5 is set. A parameter PDI_WT1C is acquired, and a modulation C after-rise waiting period t6$rw$ is set. A parameter PDI_WT2C is acquired, and a modulation C after-fall waiting period t6$fw$ is set. Moreover, a parameter PDI_REPC is acquired, and the number of repetitions of the modulation C output cycles is set to n.

Further, the waveform generation logic section 35 acquires, from the partial register group 32$c$ in the time management register section 32, time management parameters regarding the modulation C clocked rise amount VRCΔ and a modulation C clocked fall amount VFCΔ. Specifically, parameters PDI_RTC1 to r are acquired, and rise clock time widths ΔtR1 to ΔtRt are set. Parameters PDI_FTC1 to u are acquired, and fall clock time widths tF1 to ΔtFu are set. At this time, t≧CRN and u≧CFN are satisfied.

The waveform generation logic section 35 outputs the D/A conversion data Data and the writing control signal, so as to obtain the parallel data output voltage waveform WFc shown in FIG. 10 in synchronous with the reference clock CT34 based upon the waveform setting parameters obtained from the partial register group 31$c$ in the modulation setting register group 31 and the partial register group 32$c$ in the time management register section 32.

First, as shown in FIG. 10, after the output control operation in the modulation B, the output value is held at the modulation C rise initial value VRC0 at the modulation C start waiting time t5.

Subsequently, in the modulation C rise period t6$r$, such a control is performed that the output value is successively increased by the modulation C clocked rise amount VRCΔ in each fall clock time width ΔtRi (i=1 to CRN) over the number of rise clocks CRN from the modulation C rise initial value VRC0. As a result, the output value reaches the modulation C fall initial value VFC0 at the end of the modulation C rise period t6$r$.

Thereafter, in the modulation C after-rise waiting period t6rw, the parallel data output voltage waveform WFc is held at the modulation C fall initial value VFC0.

Next, in the modulation C rise period t6r, such a control is performed that the output value is successively decreased by the modulation C clocked fall amount VFCΔ in each fall clock time width ΔtFj (j=1 to CFN) over the number of fall clocks CFN from the modulation C fall initial value VFC0. As a result, the output value reaches the modulation C rise initial value VRC0 at the end of the modulation C fall period t6f.

Thereafter, in the modulation C after-fall waiting period t6fw, the parallel data output voltage waveform WFc is held at the modulation C rise initial value VRC0.

As thus described, the D/A conversion data Data and the writing control signal WR for obtaining the parallel data output voltage waveform WFc in each modulation C output cycle t6 are outputted by the Rise/Fall management section 37 inside the waveform generation logic section 35. Thereafter, under the control of the number-of-outputs counter 36, the parallel data output voltage waveform WFc is repeated in number equivalent to the number n of repetitions of the modulation C output cycles, and the output control in the modulation C is completed.

It is to be noted that the outputs of the D/A conversion data Data and the writing control signal WR are performed in the same manner as in the modulation A each at the modulation C start waiting time t5, the modulation C rise period t6r, the modulation C after-rise waiting period t6rw, the modulation C fall period t6f, and the modulation C after-fall waiting period t6fw.

Returning to FIG. 6, the parallel data output control circuit 3 of the second embodiment can output the interruption processing to the CPU or the like after the processing of the step ST3, so as to capture waveform setting parameters for generation of a new parallel data output voltage waveform inside the modulation setting register group 31 and the time management register section 32.

It is to be noted that there are some cases where D/A conversion data Data of 12 bits, 16 bits, or the like, is required, depending upon performance of the parallel DAC 2. Assuming the case of meeting such a request from the user side, it is proposed to previously configure the waveform generation logic section 35 and the resister 38 with a 16-bit width. When the parallel DAC 2 has accuracy of 10 bits, low-order 10 bits of the register 38 are outputted to the parallel DAC. When the parallel DAC 2 has accuracy of 12 bits, the low-order 12 bits of the register 38 are outputted to the parallel DAC. When the parallel DAC 2 has accuracy of 16 bits, low-order 16 bits of the register 38 are outputted to the parallel DAC 2. The output can be switched, for example, by electrically connecting the DAC 2 with the 10 bits of the external output terminal group (external output terminal group that can obtain the D/A conversion data Data; hereinafter occasionally abbreviated as "external output terminal group Data"). This enables the general purpose availability of the control microcomputer 1 to be further enhanced and the semiconductor device to be more preferable as a semiconductor device for controlling the parallel DAC. As for an unused external output terminal of the external output terminal group Data having 16 external output terminals, its potential may be set to a reference potential or a power potential, or fixed into a high impedance state. Further, in the case of a 17-bit parallel DAC, high-order 16 bits of the parallel DAC are provided with the D/A conversion data Data from the external output terminal group, and the lowest-order one bit of the parallel DAC is provided with a fixed signal.
(Effect)

In the second embodiment, the outputs of the D/A conversion data Data and the writing control signal WR to the parallel DAC 2 are performed by the parallel data output control circuit 3 as dedicated hardware. The parallel data output control circuit 3 executes a parallel data output control operation for generating the D/A conversion data Data and the writing control signal WR so as to obtain a parallel data output voltage waveform defined by the waveform setting parameters stored inside the modulation setting register group 31 and the time management register section 32.

The parallel data output control circuit 3 of the second embodiment is capable of performing the above parallel data output control operation independently of the control means such as the CPU after setting of the waveform setting parameters inside the modulation setting register group 31 and the time management register section 32. Namely, after setting of waveform setting parameters in the modulation setting register group 31 and the time management register section 32, even when interruption processing or the like occurs in the control means such as the CPU, the parallel data output control circuit 3 is not influenced by the processing and can perform the parallel data output control operation.

Consequently, the parallel data output control circuit 3 has the effect of being able to establish parallel data output control on the parallel DAC 2 with high accuracy.

In addition, it is possible to set waveform setting parameters that define a rise waveform and a fall waveform inside the modulation setting register group 31 and the time management register section 32. Taking the modulation A as an example, parameters including the modulation A clocked rise amount VRAΔ, the rise clock time widths ΔtR, the number of rise clocks ARN, the modulation A clocked fall amount VFAΔ, the fall clock time widths ΔtF, the number of fall clocks AFN can be set.

Therefore, the parallel data output control circuit 3 of the second embodiment is capable of outputting the D/A conversion data Data and the writing control signal WR which allow realization of a variety of rise waveforms and fall waveforms.

This enables the parallel data output control circuit 3 of the second embodiment to independently set a rise waveform and a fall waveform by means of the waveform setting parameters. Hence the parallel data output control circuit 3 exerts the effect of being able to set the rise waveform and the fall waveform of different contents in response to the case of a response characteristic of an external circuit being different, and also set the rise waveform and the fall waveform of the same content in response to the case of the response characteristic of the external circuit being the same.

In addition, it is possible to set waveform setting parameters that define rise and fall initial values inside the modulation setting resister group 31. Taking the example of the modulation A for example, it is possible to set the initial value of the parallel data output voltage waveform WFa by means of the initial value setting parameters that define the modulation A rise initial value VRA0 and the modulation A start waiting time t1.

Accordingly, the parallel data output control circuit 3 of the second embodiment can set the initial values of the rise waveform and the fall waveform with high accuracy.

Further, it is possible to selectively set a rise or fall after the setting of the initial value by means of the above-mentioned waveform setting parameter. Taking the modulation A as an example, it is possible to obtain the parallel data output voltage waveform WFa with its polarity being positive by setting the modulation A clocked rise amount VRAΔ and the modulation A clocked fall amount VFAΔ to positive, while on the other hand, it is possible to obtain the parallel data output voltage waveform WFa with its polarity being negative by setting the modulation A clocked rise amount VRAΔ and the modulation A clocked fall amount VFAΔ to negative.

Further, the waveform setting parameters inside the modulation setting register group 31 include a parameter that defines time in which a state is held after the output value has risen and reached the maximum value or fallen and reached the minimum value. Taking the example of the modulation A for example, it is possible to set the holding time after reaching of the extreme value by means of the modulation A after-rise waiting period t2rw.

Accordingly, the parallel data output control circuit 3 of the second embodiment can set the extreme values of the rise waveform and the fall waveform with high accuracy.

Further, the modulation setting register group 31 and the time management register section 32 have the partial resister groups 31a to 31c and the partial register groups 32a to 32c that store waveform setting parameters in each of the modulations A to C which are different in modulation contents (contents of the parallel data output voltage waveforms)

Accordingly, the parallel data output control circuit 3 of the second embodiment exerts the effect of being able to relatively easily perform the parallel data output control that realizes a plurality of kinds of parallel data output voltage waveforms by a plurality of modulations.

Further, a semiconductor device made up of the parallel data output control circuit 3 and the parallel DAC 2 can perform a D/A conversion output with high accuracy.

While the invention has been shown and described in detail, the foregoing description is in all aspects illustrative and not restrictive. It is therefore understood that numerous modifications and variations can be devised without departing from the scope of the invention.

What is claimed is:

1. A semiconductor device, comprising:
   a central processing unit; and
   a parallel data output control circuit comprising:
      a parameter storage section capable of storing waveform setting parameters that define a parallel data output waveform which varies in time series; and
      a waveform generation logic section that generates output waveform data defined by said waveform setting parameters,
   wherein said parallel data output control circuit generates said output waveform data and a write control signal based on a base clock signal, outputs said output waveform data and said write control signal to a D/A converter circuit, and issues a data transfer request to said central processing unit in accordance with completion of outputting all of said output waveform data.

2. The semiconductor device according to claim 1, wherein said waveform setting parameters have rise and fall parameters that define rise and fall waveforms of said parallel data output waveform,
   said rise parameters include the number of rise clocks, a rise clock time width and a clocked rise amount, and said fall parameters include the number of fall clocks, a fall clock time width and a fall-clocked amount, and
   said waveform generation logic section generates said parallel data so as to realize a rise waveform which rises by said clocked rise amount in each said rise clock time width in number of times equivalent to said number of rise clocks, and to realize a fall waveform which falls by said clocked fall amount in each said fall clock time width in number of times equivalent to said number of fall clocks.

3. The semiconductor device according to claim 1, wherein said waveform setting parameters include an initial value setting parameter at the start of variations in parallel data.

4. The semiconductor device according to claim 1, wherein said waveform setting parameters include a parameter capable of setting a polarity of said parallel data output waveform.

5. The semiconductor device according to claim 1, wherein said waveform setting parameters include a parameter that defines the time for holding a state after reaching of an extreme value by said parallel data output waveform.

6. The semiconductor device according to claim 1, wherein said parameter storage section has a plurality of partial parameter storage sections, and said plurality of partial parameter storage sections are capable of storing a plurality of kinds of waveform setting parameters with contents of said parallel data output waveforms different from one another, and
   said waveform generation logic section is capable of outputting a plurality of kinds of parallel data output waveforms based upon said plurality of kinds of waveform setting parameters obtained from said plurality of partial parameter storage sections.

7. The semiconductor device according to claim 1, wherein said waveform setting parameters include parameters capable of mutually independently setting a rise waveform and a fall waveform of said parallel data output waveform.

8. The semiconductor device according to claim 1, wherein said waveform generation logic section has a writing control signal outputting function of outputting a writing control signal that indicates a timing for capture of said output waveform data.

9. The semiconductor device according to claim 8, wherein said waveform setting parameters include parameters capable of setting a polarity, an output period and an output position of said writing control signal.

* * * * *